United States Patent [19]

Kawahara

[11] Patent Number: 4,551,962
[45] Date of Patent: Nov. 12, 1985

[54] WEIGHING AND PACKING APPARATUS

[75] Inventor: Kazuto Kawahara, Tokyo, Japan

[73] Assignee: Teraoka Seiko Co., Ltd., Tokyo, Japan

[21] Appl. No.: 420,719

[22] Filed: Sep. 21, 1982

[30] Foreign Application Priority Data

| Sep. 25, 1981 | [JP] | Japan | 56-142743[U] |
| Sep. 25, 1981 | [JP] | Japan | 56-142744[U] |
| Sep. 30, 1981 | [JP] | Japan | 56-145298[U] |
| Nov. 30, 1981 | [JP] | Japan | 56-178608[U] |
| Dec. 19, 1981 | [JP] | Japan | 56-190129[U] |
| Dec. 19, 1981 | [JP] | Japan | 56-190131[U] |
| Mar. 5, 1982 | [JP] | Japan | 57-31081[U] |

[51] Int. Cl.$^4$ .......................................... B65B 61/00
[52] U.S. Cl. ...................................... 53/131; 53/219; 53/390; 53/389
[58] Field of Search ............... 53/131, 219, 389, 390, 53/502, 210; 177/2–13, 245; 346/9–12; 226/168, 174, 189

[56] References Cited

U.S. PATENT DOCUMENTS

| 2,827,743 | 3/1958 | Rumsey, Jr. | |
| 3,170,274 | 2/1965 | Roberts et al. | |
| 3,367,589 | 2/1968 | Chant et al. | 53/390 |
| 3,381,449 | 5/1968 | Vaughan | 53/219 |
| 3,383,832 | 5/1968 | Grant et al. | |
| 3,442,064 | 5/1969 | Conti | 53/219 |
| 3,595,456 | 7/1971 | Rosenthal | 53/390 |
| 3,691,727 | 9/1972 | Doerscheln | 53/390 |
| 3,724,167 | 4/1973 | Pizmoht | 53/390 |
| 3,800,499 | 4/1974 | Feldman | 53/390 X |
| 4,291,516 | 9/1981 | Warner et al. | 53/219 |
| 4,301,878 | 11/1981 | Soe | 177/8 X |
| 4,415,048 | 11/1983 | Teraoka | 177/5 |
| 4,440,248 | 4/1984 | Teraoka | 177/4 |

Primary Examiner—John Sipos
Assistant Examiner—Donald R. Studebaker
Attorney, Agent, or Firm—Sandler & Greenblum

[57] ABSTRACT

A novel weighing and packing apparatus is provided by which an article is weighed, and weighed article is manually packed with film. The apparatus may be provided at its working table with a packing device for manual packing and a weighing mechanism in an integral manner, or further with a label printer. According to the apparatus provided, an improvement in working efficiency in weighing and packing work is realized. Further, a working space can be minimized.

47 Claims, 37 Drawing Figures

WEIGHING AND PACKING APPARATUS

FIELD OF THE INVENTION

This invention relates to a weighing and packing apparatus. More particularly, the invention relates to an apparatus for weighing articles by a weighing mechanism incorporated in the apparatus and for packing the weighed articles with film manually.

DESCRIPTION OF THE PRIOR ART

Conventionally, manual weighing and packing work is carried out with the separate use of a weighing device, a label printer and a packing device, or a weighing printer consisting of a weighing device and a label printer, and a packing device, in a manner that an article is weighed and, then, after transferred on a packing device, the article is packed with film and labelled.

Accordingly, since two or three separate devices are required, broad space is necessary for working. Further, the total costs of the device are expensive. In addition, since different movement at different place is required for weighing, packing and labelling work, working efficiency is low and mistakes such as mislabelling are liable to occur.

SUMMARY OF THE INVENTION

The first object of the invention is, therefore, to provide an inexpensive apparatus in which a weighing device and a packing device are incorporated in its work table so that weighing and packing work is carried out continuously on the table, in order to improve the working efficiency and to enable to work in a smaller space.

The second object of the invention is to provide an apparatus in which a label printer as well as a weighing device and a packing device is incorporated in the table to further improve the working efficiency and to enable to work in smaller space.

The third object of the invention is to provide an apparatus in which the label printer is incorporated and in which the input board of the printer is provided at the frame or the table of the apparatus, so that a worker can work conveniently and that the apparatus exhibits a good appearance.

The fourth object of the invention is to provide an inexpensive structure for supporting rolls for packing films used for the apparatus, which functions also as a reinforcing structure.

The fifth object of the invention is to provide an improved structure for feeding films which can support a plurality of rolls for films of different sizes or different materials, and which can change the film or films to be used, manually or automatically, so as to improve the usability of the apparatus.

The sixth object of the invention is to provide the structure for supporting a plurality of rolls and for changing the films to be used, in which means is provided for preventing the films from adhering or contacting with each other at the time films are changed, so as to improve the film feeding movement.

The seventh object of the invention is to provide an apparatus in which a weighing mechanism, a label printer, a pricer and a packing mechanism are electrically combined, so as to improve its usability.

The weighing and packing apparatus realizing the objects mentioned above, includes a table in which a weighing mechanism is incorporated, said table being provided with a lengthy film outlet for drawing out the packing film fed from interior of the table, a film cutter along the film outlet, a weighing plate of the weighing mechanism at the front position of the outlet, and a heating plate at the rear portion of the film cutter.

DESCRIPTION OF THE PREFERRED EMBODIMENTS

Figure 1:
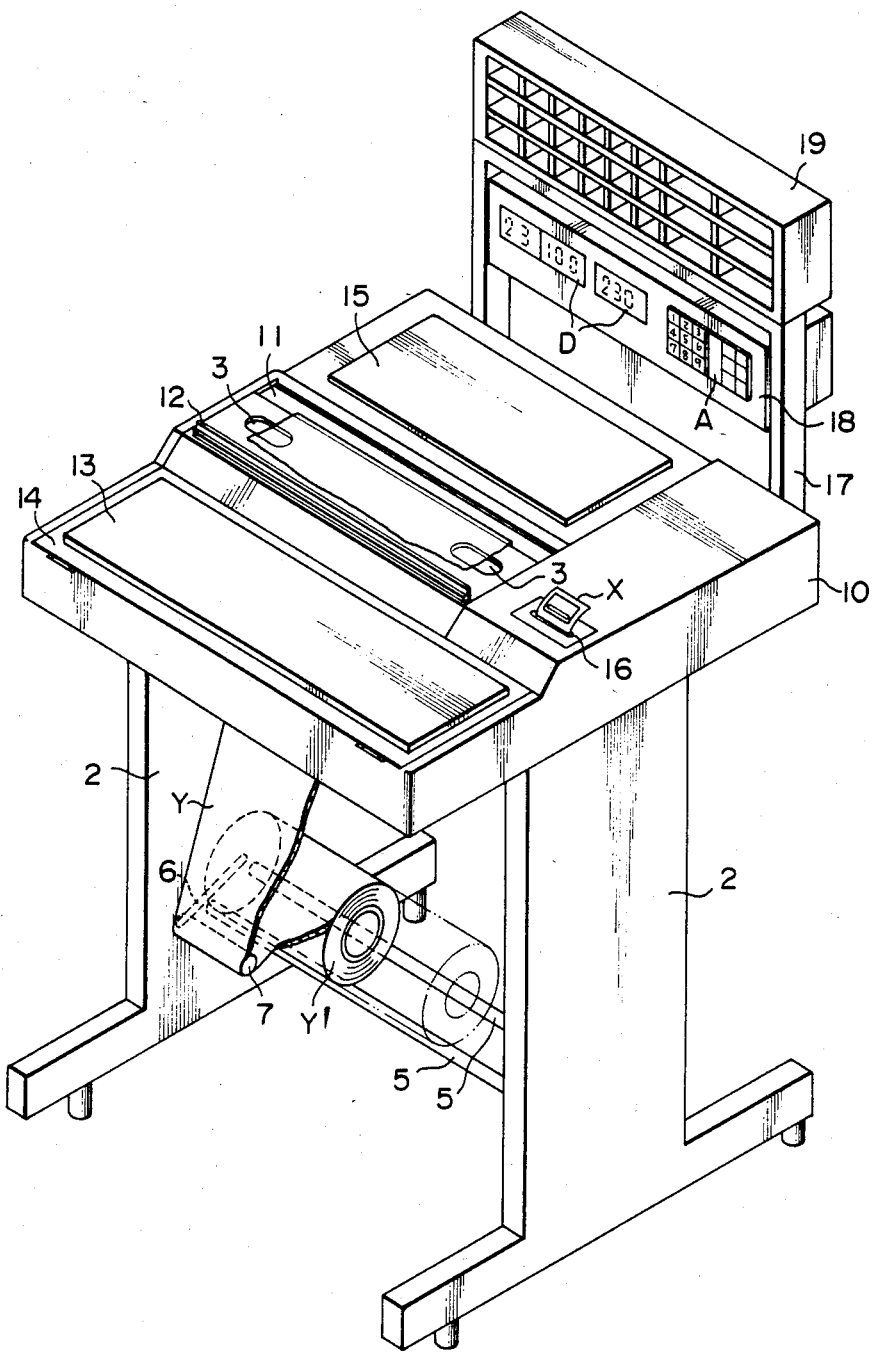
FIG. 1 is a perspective view of the weighing and packing apparatus of the invention.
Figure 2:
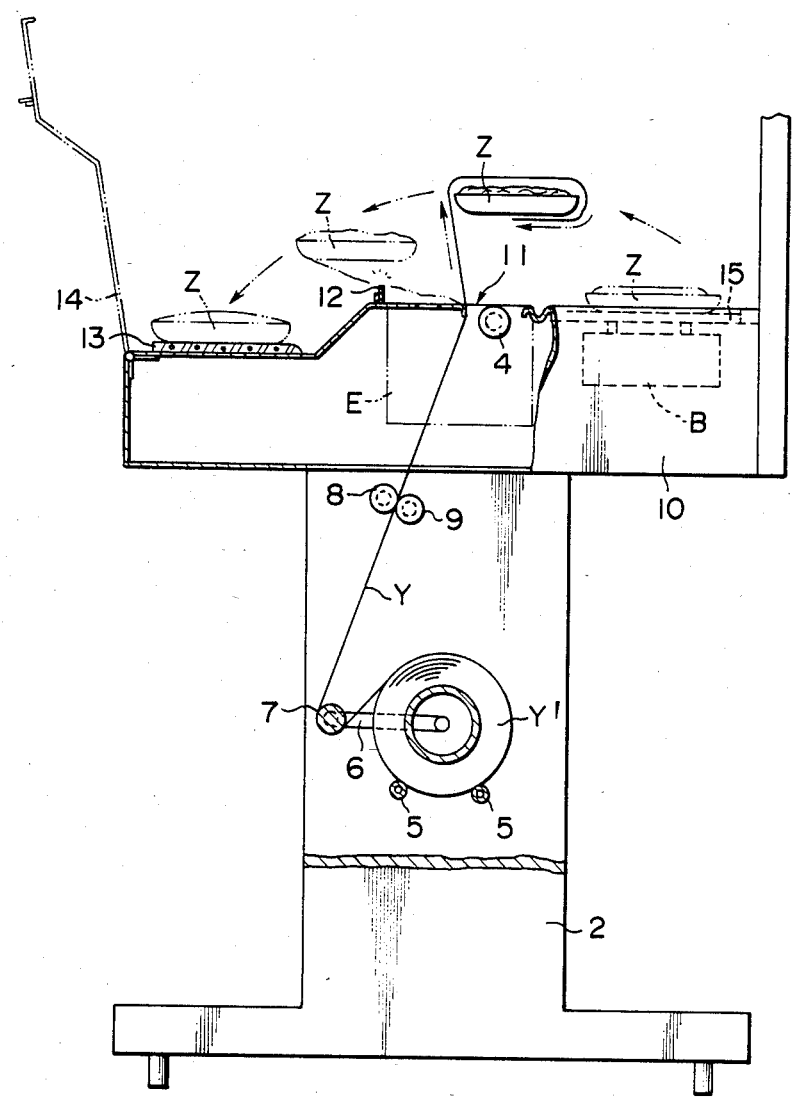
FIG. 2 is a side sectional view, partly cut out, of the apparatus.

As will be seen from FIGS. 1 and 2, a work table 10 of a flat rectangular form, is mounted on reverse T shaped and parallel-positioned legs 2,2.

Between legs 2,2 is placed a pair of rotatable rollers 5,5 for supporting a film roll Y' thereon. The film roll Y' is rolled with packing film Y.

One end of a tension arm 6 is pivoted to the leg 2 while the other end has a rotatable tension roller 7.

A pressing roller 8 and a one way roller 9 having one way clutch therein, are extended between the legs 2,2 and at a position between the tension roller 7 and the table 10. The one way roller 9 rotates only in the clockwise direction so that the film Y may be fed only in the upward direction between the rollers.

The table 10 is provided at its central portion with a length hole 11 for drawing out the film Y. A guide roller 4 provided in parallel with the hole 11 feeds the packing film Y out from the hole 11. A weighing plate 15 provided on the table 10 function also as a table for packing work.

Further a stepped plate 14 provided openably at the sitting side of the table. The plate can be opened to the sitting side so that a film roll Y' can be set on parallel rollers 5,5. A film cutter 12 is projected in parallel to the film outlet 11. The cutter 12 is formed of a knife heated by a heater housed below the stepped plate 14 at the area of a heating base 13. Two finger holes 3,3 are provided at a film receiving area between the film cutter 12 and the film outlet 11, so that the packing film may be easily taken out.

In operation, an article Z to be packed is placed on the weighing plate 15 as shown in upper right hand position in FIG. 2. After its weight is weighed, the plate 15 is used as work table in such a manner that film Y feeded out from the film outlet 11 is pulled by both hands of worker so that the article Z may be wrapped. After the article is wrapped, the film Y is cut by the film cutter 12.

Then, the marginal film portion at both sides of the article is folded to the bottom of the article Z by the worker. Subsequently the article is placed on the heating base 13 as shown in the upper left hand portion in FIG. 2, so that the folded film portion is sticked to the bottom due to the heat of the heating base 13. Thus, the packing work for the article Z is finished, and the procedure is repeated.

As will be understood from the explanation above, the apparatus of the invention consists of a weighing structure and a packing structure combined integrally with each other, which are formerly used separately. Accordingly to the invention, the area necessary for the apparatus is small in comparison with those necessary for a weighing device and a packing device, respectively. Further, since many elements such as electric circuits constituting the weighing structure and the packing structure, respectively, can be used in common to the apparatus of the invention, the apparatus can be produced inexpensive. In addition, since the article is weighed prior to the time it is packed, weighing reliability is improved.

Next, an apparatus to which a label printer is incorporated for further convenience, is explained with reference to FIGS. 1 and 2.

A label printer E is provided in the right hand portion of the table 10. Its label output 16 is provided at the right margin of the table 10 and feeds printed label X. The table 10 has a reverse U shape support 17 at its front end, to which a control unit 18 is mounted.

The unit 18 houses a central processing unit CPU and is provided with a display D and an input board A consisting of a number of input keys. The unit 18 can be adjustably included so that the display D can be seen and the board A can be operated at the angle most suitable to respective operator. It may be convenient to provide a pigeonhole 19 for keeping rubber stamps 19, at the position above the support 17.

Figure 3:
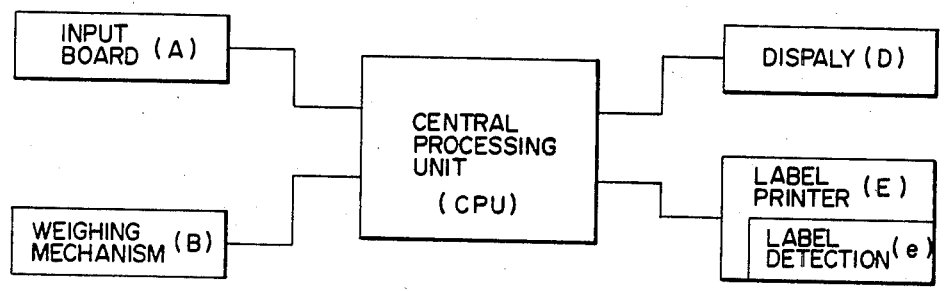
FIG. 3 is a block diagram of the apparatus.

The block diagram of FIG. 3 explains the function of respective sectons of the apparatus. According to the embodiment, an input section A, a weighing mechanism B, a display D and a label printer E are connected to a central processing unit CPU.

At the input section A, data for a particular article to be weighed by a weighing mechanism B, such as the name of the article, unit price, produced data, last date the article is effective, code number, bar code, etc., are put into the CPU by means of the operation of the key board.

The weighing mechanism B functions to put the weight data of the article Z placed on the weighing plate 15, into CPU. The CPU calculates out the price of the article on the basis of the unit price data obtained at the input section A and the weight data at the weighing mechanism B, and indicates the price together with other data on the display D and in the label issued from the label printer E. The display section D displays data such as unit price and weight by digital indication.

The label printer E fucntions to print the label X with data such as article name, unit price, weight and selling price, and to produce the printed label from the label output 16.

Further, it detects at its label detection section e that the label X is taken away and produces a detection signal.

Figure 4:
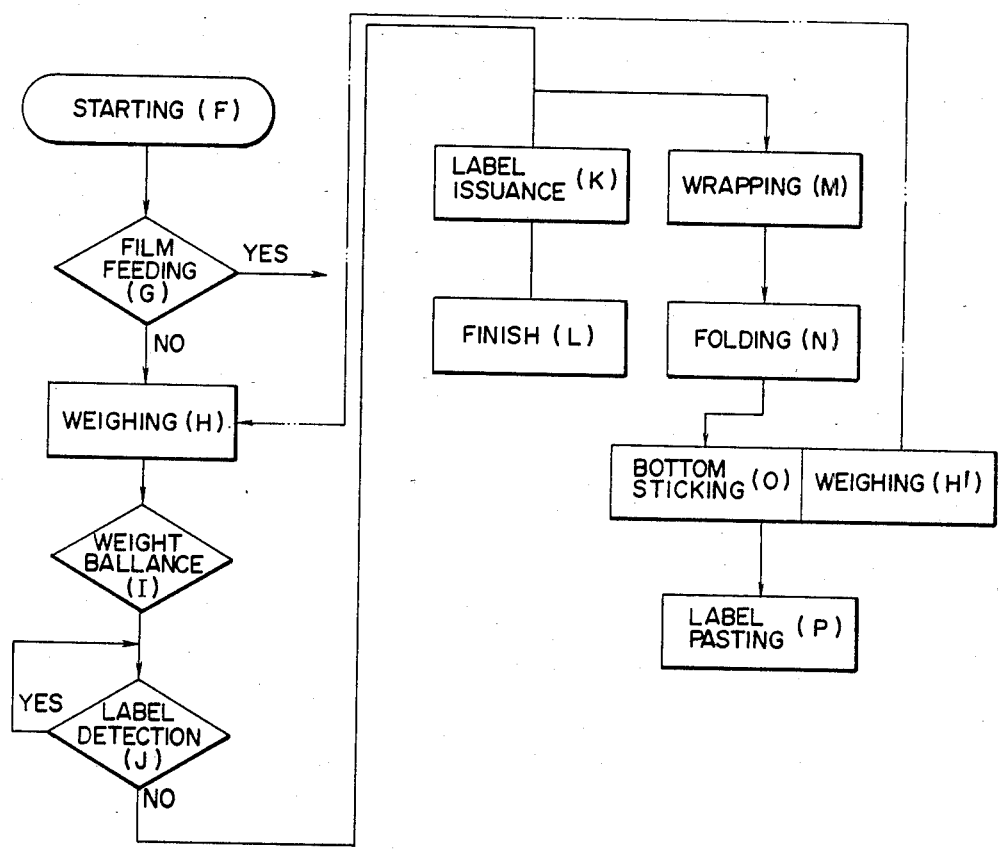
FIG. 4 is a flow chart illustrating the packing process.

The flow chart of FIG. 4 explains steps for making use of the apparatus according to the invention.

As shown in the chart, the weighing work (step H) starts when it is confirmed that the packing film Y is not exhausted (step G).

When the article Z is placed on the weighing plate 15 (step H), the weighing mechanism B is operated. In consequence, signal is produced that the weight is balanced (step I) and the label is printed at the label printer E. It is confirmed that former label X is taken away from the label outlet 6 (step J) a new label is issued (step K). Simultaneously, data are displayed at the display section D.

Wrapping cook (step M) is so carried out that packing film Y is folded over the article Z to its bottom as shown in FIG. 2 and that, then the film Y is cut by a film cutter 12. The side margin of the film is folded to the article bottom (step N).

The article Z is then placed on the heating plate 13 so that the film folded is stuck by heat to the article bottom (step O), and label X is stuck to the article Z (step P).

At the sticking step O, a weighing step H' for a new article can be started so that a continuous work may be smoothly effected.

In this way, if a label printer is incorporated in the apparatus, printed label issuing step and packing step can be effected simultaneously. Consequently, a situation that a particular label is mistakenly stuck to an article to which the label is not to be stuck, can be ended. In addition, since the weighing work for the second article has already been started while the first article is packed, an improvement in workability and is efficiency is realized.

Although a reference is made to a single film roll Y' it should be understood that a plurality of film rolls may be used, each of which is different in width or color depending on the nature of the article, so as to spare the step of exchanging the film roll. Naturally the number of the tension rollers and the one way rolls is equal to that of the film rolls.

FIGS. 5 through 10 indicate further embodiments of the weighing and packing apparatus of the invention. More particularly, they show various table structures for the apparatus in which a label printer is incorporated.

In these figures, a table 100 or 101 is provided with a film outlet 11, a film cutter 12, a heating board 13 and a weighing plate 13 for a weighing mechanism B, as is explained with reference of FIGS. 1 and 2.

Figure 5:
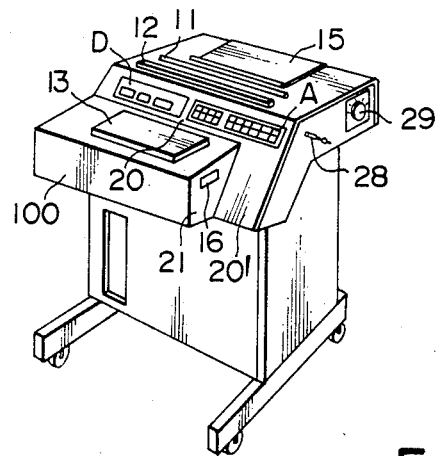
FIGS. 5 through 9 are perspective views of further embodiment of the apparatus.
Figure 6:
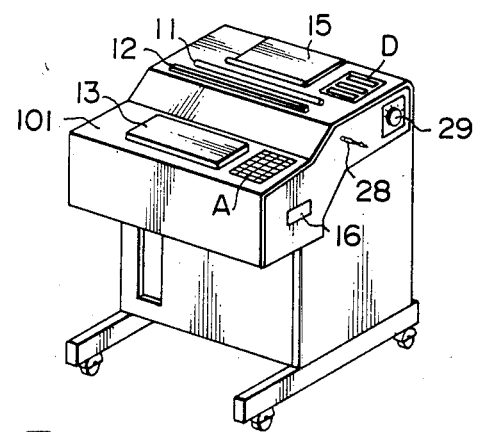

In FIG. 5, a table 100 is provided with an input board A for a label printer E, and a display D, at the inclined surface 20 formed between the film cutter 12 and the heating board 13.

The table 100 is provided with an extended inclined surface 20' to which a box having a vertical wall 21 at its right side, is fixed. A label printer E is housed below the heating plate 13 (FIG. 10), and the label output 16 is provided at the vertical wall 21.

The apparatus has a plurality of film rolls $Y_1'$, $Y_2'$, $Y_3'$ and any one of films $Y_1$, $Y_2$, $Y_3$ of the rolls may be used. According to the embodiment shown in FIG. 10, a pain of legs 22 rotatably support three film rolls $Y_1'$, $Y_2'$ and $Y_3'$ so that they may feed films on the table through film outlets 11 by means of tension rollers 23.

Fan-shaped supporting elements 24 for supporting films is provided rotatably or in a fixed manner below the film outlet 11 of the table. Film retainers 25, 26, 27 are provided interval to the rotating direction of the element 24, at a predetermined so that they main retain the film $Y_1$, $Y_2$, $Y_3$.

The supporting element 24 is connected to a handle 28, so that any one of the retainers 25, 26, 27 can be positioned immediately below the film outlet 11, when the handle is operated. Further the variation of the structure for feeding a plurality of films, will be explained in a latter stage.

Although the apparatus of the invention fulfils packing, weighing and label-issuing functions, it can work with a single function only for starting electricity. A switch 29 at one side of the table 100 is provided for engaging the structure necessary for fulfiling only the objected function. For fulfiling the packing function, a cutter 12 and a heating board 13 should be energized, while for the weighing function, electric power should be circulated through weighing mechanism B, central processing unit CPU, input board A and display D. In order that label may be issued, input board A, display D, CPU, and label printer E should be activated. Further, a switch may be provided to fulfil two functions such as packing and label-issuing functions, and, weighing and label-issuing functions.

FIGS. 6 through 9 represent, respectively, further embodiments of the apparatus shown in FIG. 5. Specifically, the apparatus shown in FIG. 6 has no inclined portion 20' of FIG. 5, that is, the length of the area for receiving the heating plate 13 corresponds to that of the table 101. The apparatus has a display D at the right side of the weighing plate 15, an input board A at the right side of the heating plate 13, and a label outlet 16 at the side wall of the table 101.

Figure 7:
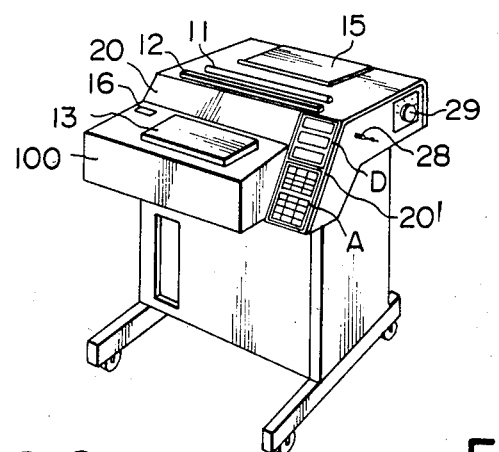

FIG. 7 illustrates a structure provided with the input board A and the display D at the inclined surface 20, and the label issuance outlet 16 at the left side of the heating plate 13.

Figure 8:
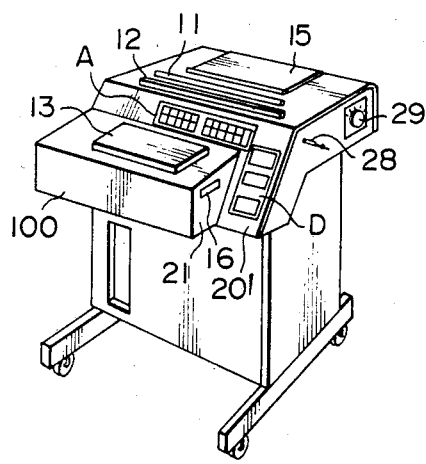

FIG. 8 represents a structure in which the input board A is provided at the inclined surface 20, and the display D at the extended inclined surface 20'.

Figure 9:
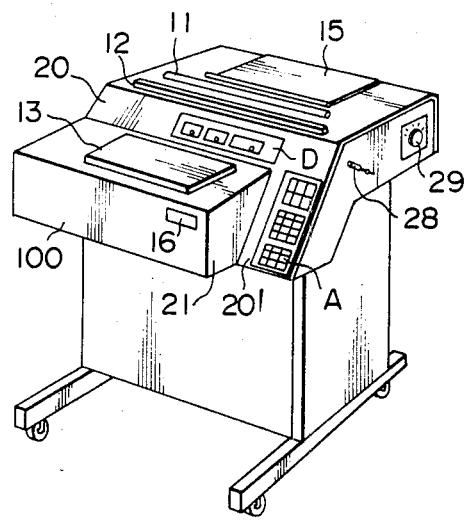
Figure 10:
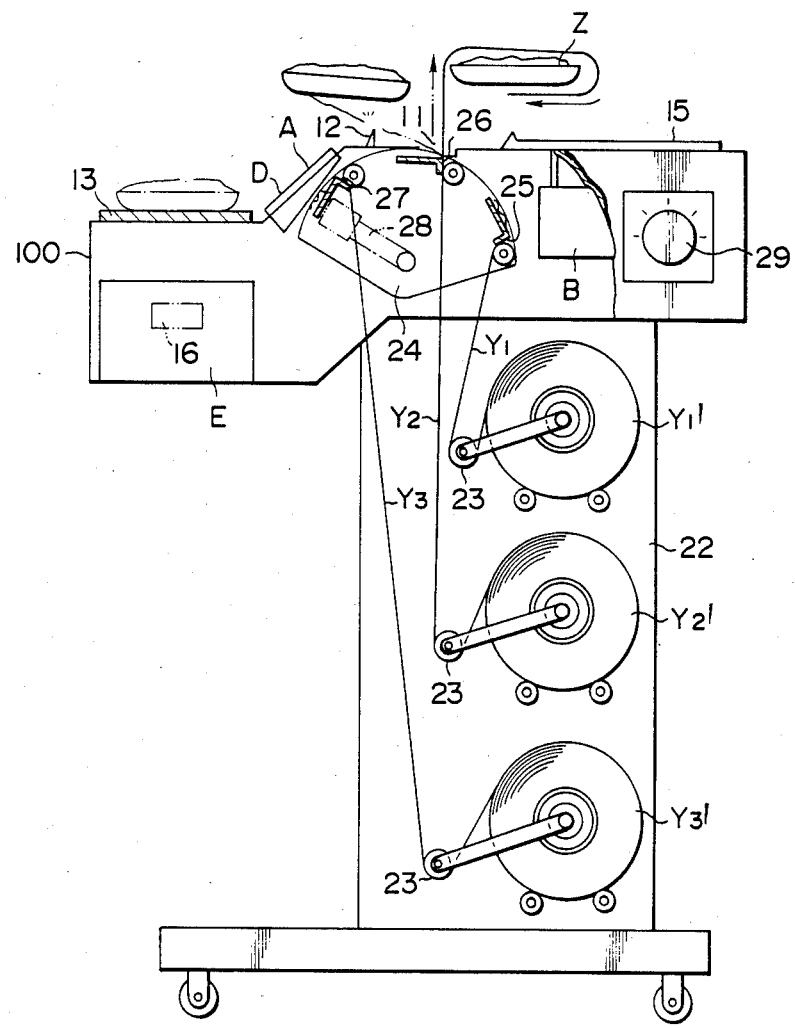
FIG. 10 is a side sectional view, partly cut out, of the apparatus shown in FIG. 5.

FIG. 9 shows a structure having the display D at the inclined surface 20, the input board A at the extended inclined surface 20' and the label outlet 16 at the front wall of the table 100.

In these embodiments, since the input board A, the display D and the label outlet 16 are positioned near the heating plate 16, i.e. at the position near the operator, he can work conveniently. Further, the apparatus exhibits a good appearance due to the fact that the input board A and the display D are set into the table.

FIGS. 11 through 16 explain improvements in the structure for supporting film rolls. In these figures, the same reference numbers represent similar elements of FIG. 9.

Figure 11:
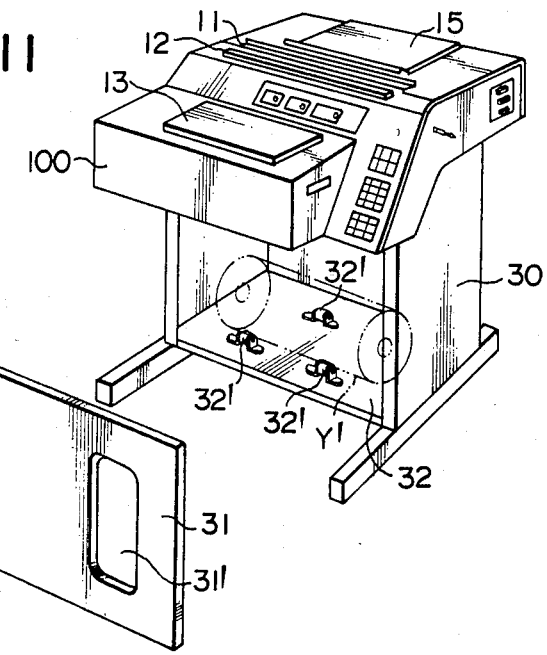
FIG. 11 is a perspective view of the apparatus having a structure for supporting an improved film roll.

In FIG. 11, a box shaped leg 30 has a front plate 31 which can be taken away so as to set a film roll into the box 30. The plate 31 has a window from which the remaining amount of the film can be watched. Otherwise the window may be provided in the side plates. Alternatively, the front plate 31 itself may be made of transparent plastics.

A bottom plate 32 of the leg 30 is provided with three supporting elements 32' at three triangular positions, each consisting of two L shaped metals and a roller.

Figure 12:
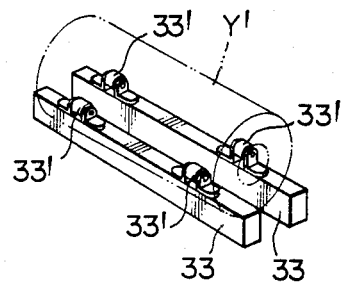

FIG. 12 represent a variation of the bottom of the apparatus of FIG. 11. In this figure, two rectangular beams 33 are positioned in parallel at a distance a bit narrower than that of the film roll Y' and fixed to the side plates of the leg 30. Each beam 33 is provided with two supporting elements 33' consisting of L shaped sheet metals and a roller. In this way, four elements 33' support the film roll Y'.

Figure 13:
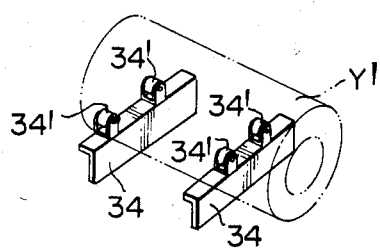
FIGS. 12 through 16, are perspective views of further embodiments of important parts of the apparatus.

FIG. 13 shows a further embodiment of the bottom of the apparatus wherein the beam 34 consists of L shaped steel. Two beams 34 are placed in parallel and fixed at their ends to the front and rear walls of the foot 30. Each beam 34 is provided with two supporting elements 34' consisting of small rollers. Thus, the four elements 34' support the film roll Y' placed crosswise on the beams.

Figure 14:
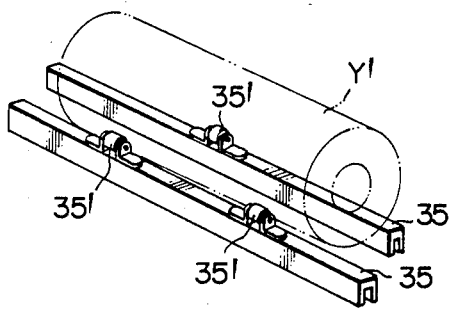

FIG. 14 shows a further embodiment using a reverse U shape steel beam 35. Three supporting elements 35' are provided on the two beams 35 and thus, the three elements support the film roll Y'.

In FIGS. 11 through 14, the rollers forming the film supporting element, are made of soft rubber or the like, so that the film may not be damaged. The number of the elements, the size and the length of the rollers should be determined so that no dent due to the roll weight is made on the film.

Figure 15:
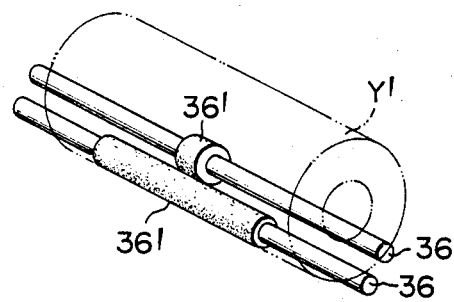

FIG. 15 illustrates a still further embodiment in which two cylindrical members 36 are fixed in parallel to side walls of the foot 30. The roll supporting elements 36 consist of shorter and longer covers loosely fitted to the beam members 36. In this embodiment, the longer cover is long enough to stably support the film roll Y'.

The length of the elements in this FIG. 15 may be shortened so as to cut costs as long as the stability for supporting the film roll can be maintained.

Figure 16:
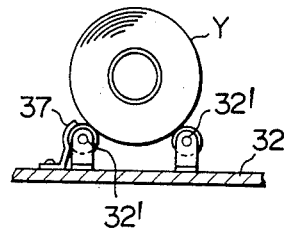

FIG. 16 is a still further embodiments in which a brake member 37 is provided to the supporting element 32' of the FIG. 11. The brake 37 consists of an elastic sheet of which one end is fixed to the element 32' while the other end is pressed along the roller of the element. The brake member can be provided to all or one of the supporting elements 32'. The number of the brake is to be decided on its performance. Since a brake 37 is provided in the element shown in FIG. 16 loosening of the film due to rotary inserting of the film roll after film is feeded out, can be effectively prevented. Naturally, the brake can be provided to the elements shown in FIGS. 12 through 15.

Due to the provision of the structure shown in FIGS. 11 through 16, the stability of the leg 30 is reinforced and, therefore, since no additional reinforcing structure is necessary, production cost is reduced. In addition, thinner steel plate may be used for forming the leg in view of the provision of the reinforcing structure.

Figure 18:
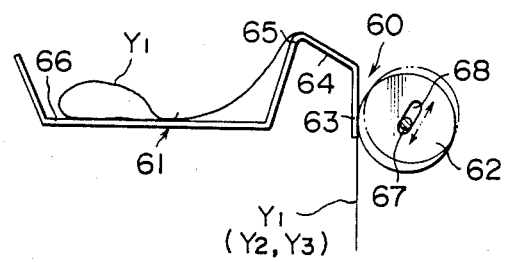
FIG. 18 is a side view of further embodiment of the film retainer shown in FIG. 17.
Figure 19:
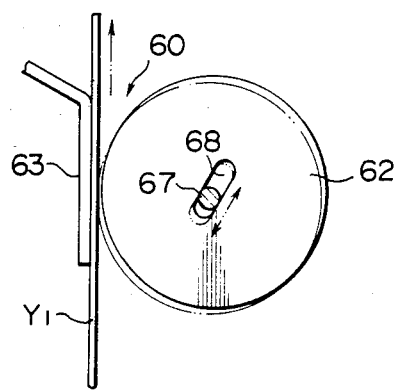
FIG. 19 is a side view of a part of the apparatus, showing a film feeding structure.
Figure 17:
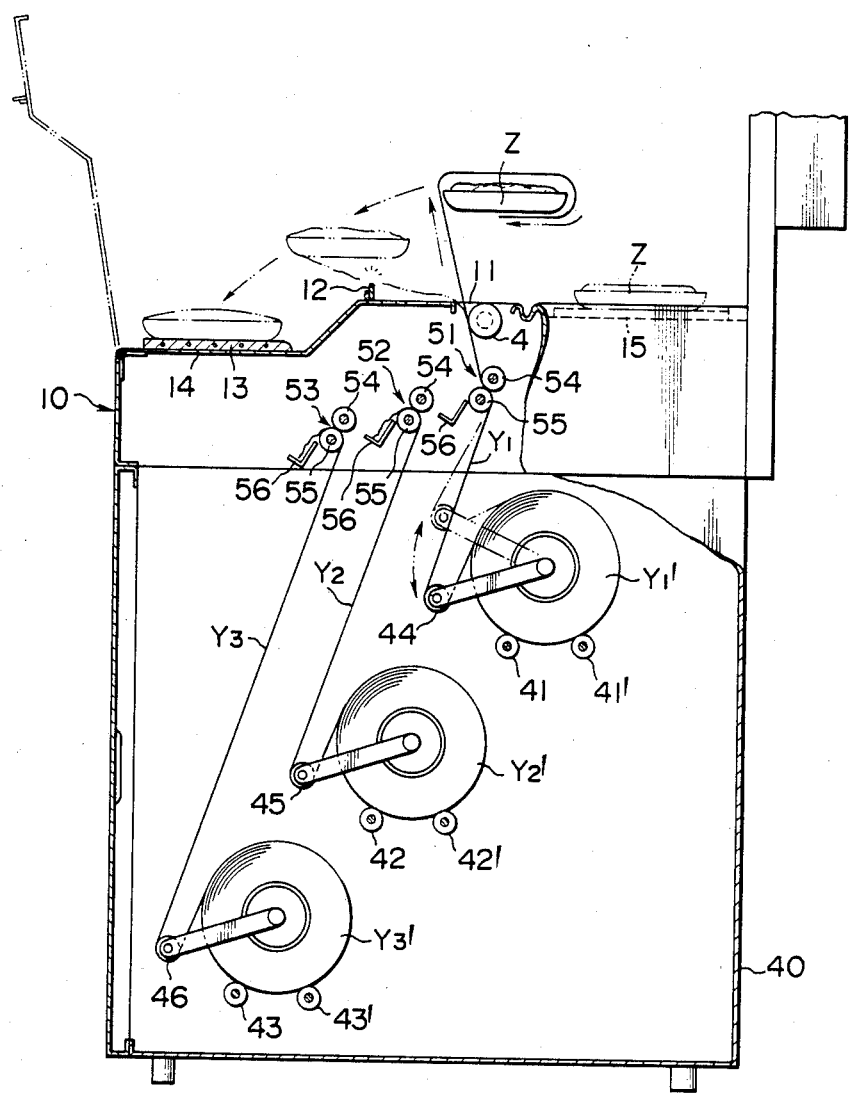
FIG. 17 is a side sectional view, partly cut out, of the apparatus illustrating a varied film feeding structure.

FIGS. 17 through 19 illustrate embodiments of a film feeding structure provided with a plurality of film rolls. In FIG. 17, main parts on the table are arranged in a manner similar to those shown in FIGS. 1 and 2.

In FIG. 17, supporting rollers 41, 41', 42, 42', 43, 43' for supporting film rolls $Y_1'$, $Y_2'$ and $Y_3'$ are extended between side walls of the foot frame 40.

Each pair of the supporting rollers is positioned in a manner that they may not overlap with each other, and supports rolls $Y_1'$, $Y_2'$, $Y_3'$, of packing films $Y_1$, $Y_2$, $Y_3$ of which width is different with each other. These film rolls $Y_1'$, $Y_2'$, $Y_3'$, are placed on each pair of supporting rollers so that film may be fed out by means of tension rollers 44, 45, 46.

With the table 10 above the film rolls are provided film retainers 51, 52, 53 at a suitable interval, each consisting of a one way roller 54, a pressing roller 55 and a film receiver 56. The one way roller 54 includes a one way clutch and rotates only to the clockwise direction so that the film may be fed to upward direction. The pressing roller 55 rotates in contact with the one way roller 54 and the film receiver 56 consists of L shaped plate.

The packing films $Y_1$, $Y_2$, $Y_3$ are fed from the rolls $Y_1'$, $Y_2'$, $Y_3'$, between rollers 54 and 55 of retainers, via tension rollers 44, 45, 46. Thus the films are tensioned and their ends are placed on the film receiver 56.

When any one of the films $Y_1$, $Y_2$, $Y_3$ is used for packing an article, an end of the particular film $Y_1$ for example on the receiver 56 is taken up by hand into the film outlet 11. In this instance, since the table 10 is provided with a pivotally openable plate 14, the work for taking the film out from the outlet 11 can be conveniently carried out. The film $Y_1$ drawn out is retained on the table due to its self-adhesive property.

When the item of the article Z is changed and thus when change of the film is necessary, the plate 14 is opened to place the film $Y_1$ on the film receiver 56 and to introduce the other film $Y_2$ or $Y_3$ over the table 10 through the film outlet 11.

FIGS. 18 and 19 illustrate further embodiments of the film retainer 51, 52 or 53. According to these embodiments, the retainer consists of a film receiver 61 and a roller 62.

The receiver 61 consists of a vertical wall 63 contacting the roller 62, an inclined surface 64 next to the wall 63, and frame 66 connecting to the surface 64 via an angled portion 65. The roller 62 journaled by a shaft 67, has a lengthy bearing hole 68 opened to the upward direction along the vertical wall 63 of the film receiver 61. Consequently, when the roller 62 goes upward, the distance between the wall 63 and the roller 62 is increased.

The after the film $Y_1$ is inserted between the vertical wall 63 and the roller 62, the film is pulled down by the tensile force of the tension roller 44. Accordingly, the roller 62 is rolled down along the bearing hole 68 and, therefore, the pressing force applied to the wall 63 is strengthened. Thus, since the film is retained strongly in this instance and, further, since the film contacts to the inclined surface 64 and the angled portion 65 due to its self-adhesive property, the film is firmly retained to the wall and, thus, the film will not fall off. When the film $Y_1$ is pulled up, the roller 62 rises and, thus, a space between the roller 62 and the wall 63 is increased. Accordingly, the film $Y_1$ can be fed.

As has been explained with reference to FIGS. 17 through 19, a plurality of film rolls can be provided in order that any one of the films can be fed out. Therefore, if a plurality of rolls of which, width is different with each other, are provided, there is no necessity for exchanging the rolls even when films are changed. Further, it is not required to provide with a plurality of packing apparatuses for different size films. Further, since films are fed through tension rollers and film retainers of the number corresponding to that of rollers, the film not used, is prevented from falling down. In addition, the procedure of taking in and out of films can be swiftly and smoothly effected.

Figure 20:
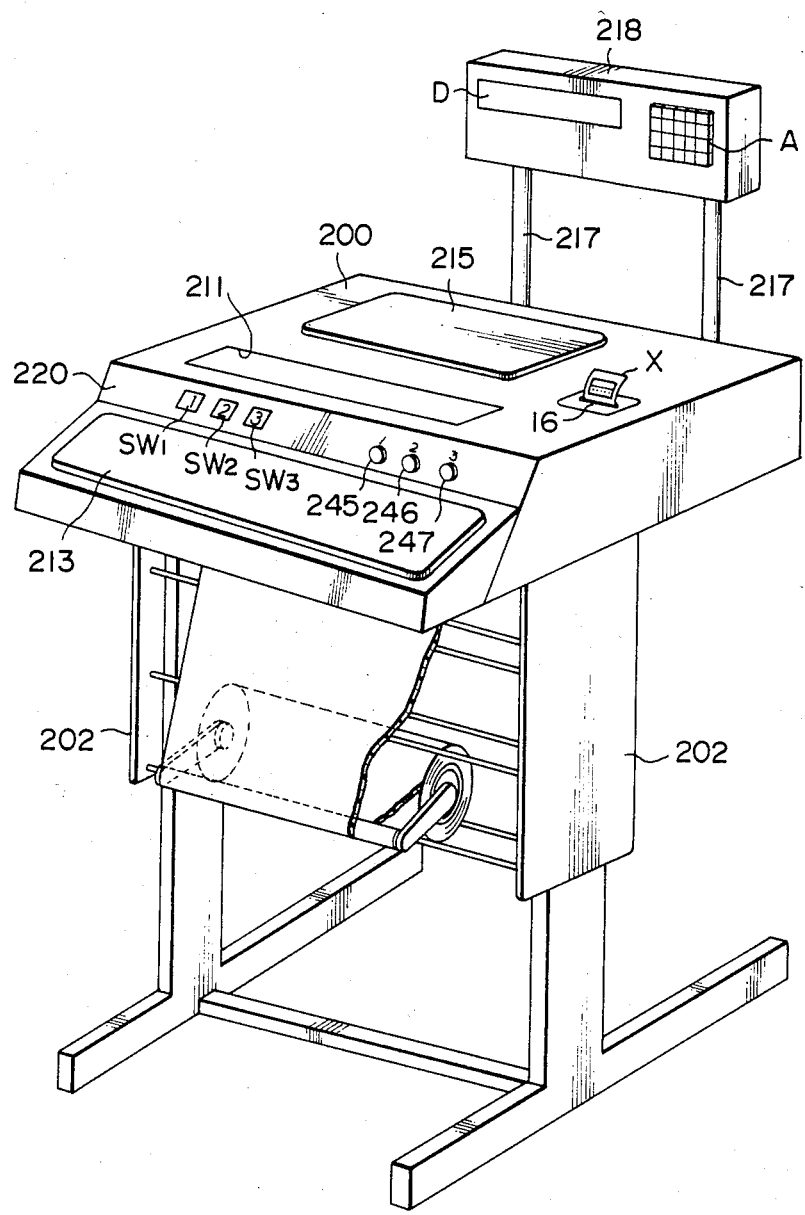
FIG. 20 is a perspective view of the apparatus having a still further embodiment of the film feeding structure.
Figure 21:
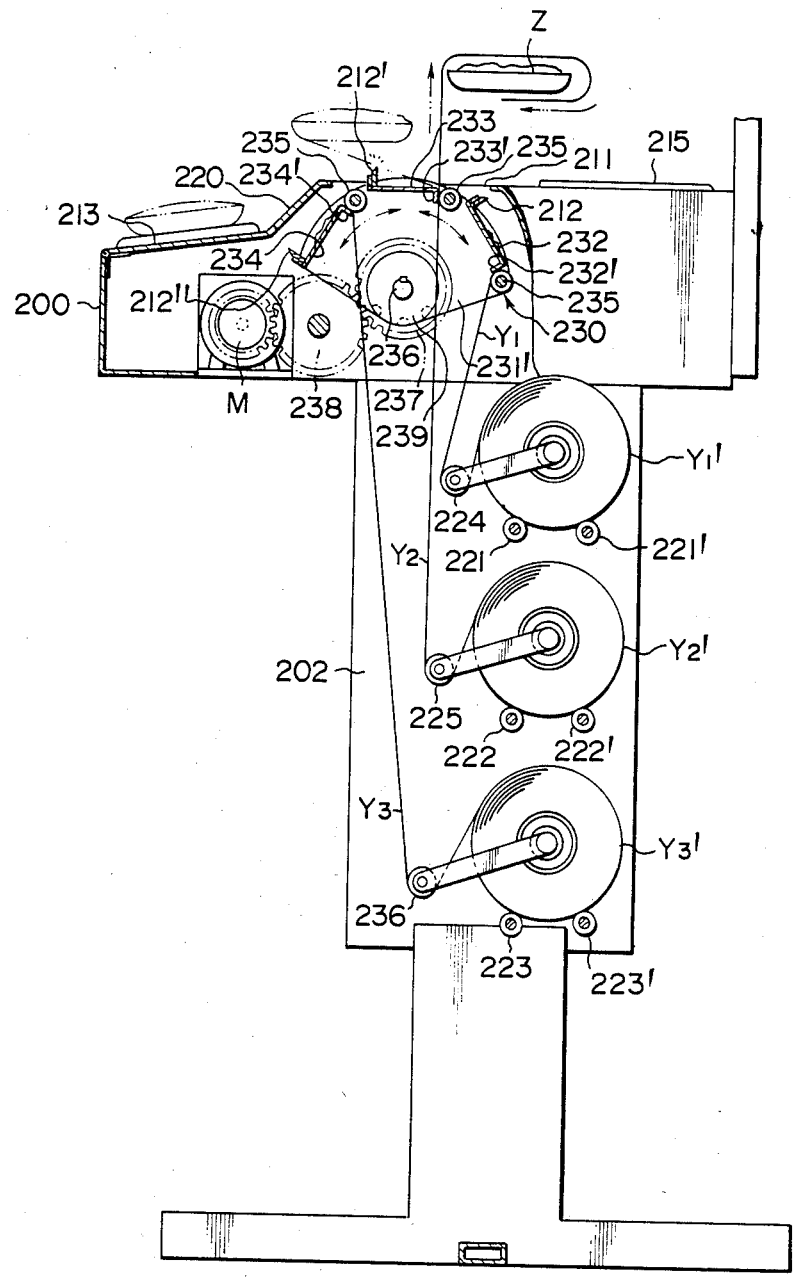
FIG. 21 is a side sectional view, partly cut out, of the apparatus of FIG. 20.

FIG. 20 through 27 show variations of the film feeding structure provided with a plurality of film rolls. In FIGS. 20 and 21, the table 200 is provided with a weighing mechanism B and a lable printer E. Further, it is provided with a weighing plate 215 of the mechanism B and a label outlet 16 of the label printer E, and a console unit 218 supported by a support 217. The unit 218 houses a central processing unit (CPU) and is provided with an input board A and a display D.

The table 200 has a window 211 for drawing film out, an inclined surface 220 and a heating plate 213. Supporting rollers 221, 221', 222, 223, 223' are extended between froot members 202, 202. Each pair of the rollers supports a film roll $Y_1'$, $Y_2'$, $Y_3'$ of film $Y_1$, $Y_2$, $Y_3$. The film are tensioned by tension rollers 224, 225, 226 so that they may be drawn out form the window or outlet 211 via film retainers 230. The retainers are provided below the outlet.

The film retainer 230 includes film receivers 232, 233, 234 which are arranged at a certain interval. In the embodiment of FIG. 21, three receivers are positioned at an interval of approximately 45 degree between two sector plates 231 and 231'.

The film receiver 232, 233, 234 consist of long plates bended downward to form vertical walls 232', 233', 234' rolls 235 facing to the vertical walls, and film cutters 212, 212', 212" formed of heater knives provided at the rear end of the plates.

Each of the film receivers 232, 233, 234 is provided with two lengthy holes 206, 206 of a size in which a finger can be inserted. Thus formed film retainer 230 receives films $Y_1$, $Y_2$, $Y_3$ fed from tension rollers, at the space between the rollers 235 and the vertical walls 232', 233', 234' so that the film ends are placed on the film receivers 232, 233, 234. Since films have self adhesive property, they are adhered to the recievers.

The rollers 235 are provided with a one way clutch so that the films are fed only upward direction. In this way, films will not be fallen off in spite of the tensile power applied by the tension rollers.

Although a film cutter is provided to each of the receivers, a single cutter may be provided near the window 211 of the table 200.

Figure 22:
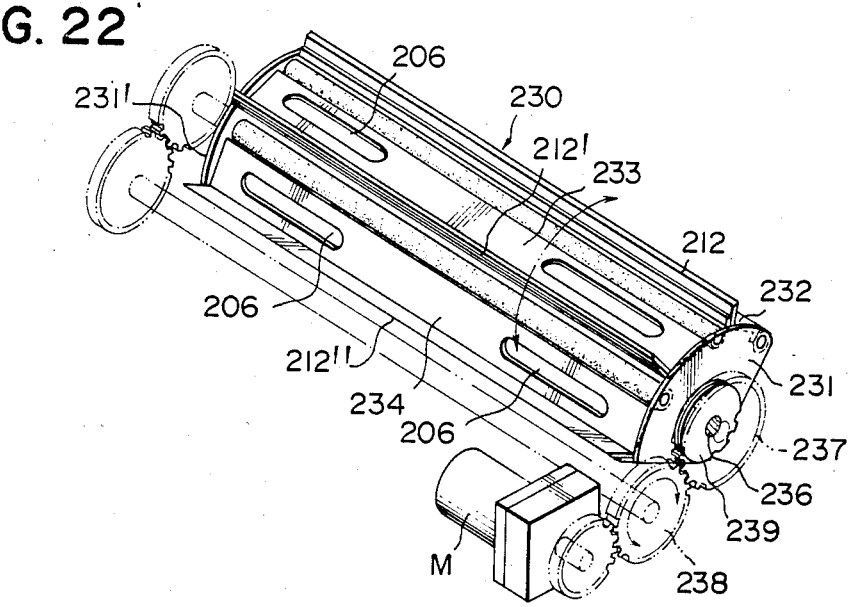
FIG. 22 is a perspective view of the film retainer shown in FIG. 21.

The shaft 236 of the film retainer 30 is projected from the supporting plates 231, 231' and is rotatably supported by the side plates of the table 200. The shaft is provided at its end with a gear 237 which engages with an intermediate gear 238 which, in turn, connects to an electric motor M. In this way, the film retainer 230 is rotated depending on the rotation of the motor M (FIGS. 21 and 22).

The film retainer 230 is so positioned that the film receivers 232, 233, 234 face to the window when it is rotated. Further, the retainer 230 is provided with a fixing plate 239 at one side or both sides, and a motor controlling switch disk 240 for controlling the stop of the motor M.

The fixing plate 239 of a disk shape is provided with grooves 242, 243 244 at positions corresponding to those of film receivers 232, 233, 234, and a stopper 241 to be engaged with one of the grooves so that the retainer 230 may be fixed at a desired position.

Figure 23:
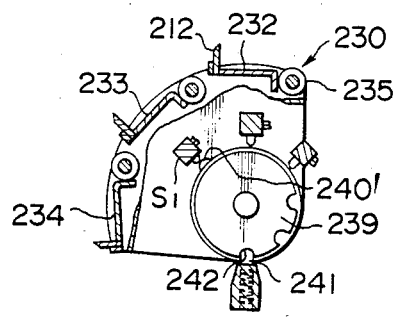
FIGS. 23 through 25, respectively, are side views of the film retainer of FIG. 22, for explaining its use.
Figure 24:
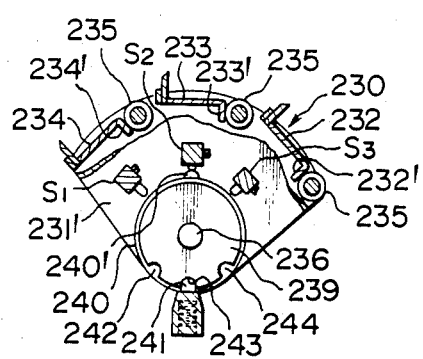
Figure 25:
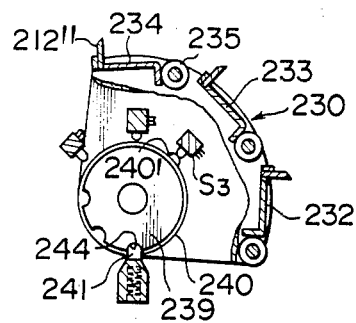

The fixing plate 239 is so positioned that the receiver 232 is positioned horizontally, i.e., immediately below the window 211, when the stopper 241 is engaged to the groove 242 (FIG. 23). Likewise, the receiver 233 or 234 is positioned below the window when the stopper 241 is engaged to the groove 243 or 244. (FIGS. 21, 24, 25).

The motor controlling switch disk 240 has a projection 240'. When the switch disk is rotated, the projection engages with any one of detection switches S1, S2, S3 consisting of closed microswitches and being provided at positions corresponding to the grooves 242, 243, 244, and it turns off the switch to stop the motor M. That is, the switch disk functions to stop the motor at every time the stopper 241 is engaged with the grooves of the fixing plate 239 (FIGS. 23 through 25).

The motor M is activated by film change switches SW1, SW2, SW3. These change switches are provided at the inclined surface 220 of the table 200 (FIG. 20). When one of the switches is pushed, the motor is activated and, accordingly, the film retainers 230 is rotated. The retainer stops at the position set by the fixing plate 239 and the switch disk 240.

The change switch is so provided that when the switch SW1 is pushed, the film retainer 230 is located at the position the stopper 241 engages with the groove 242 (FIG. 23). Similarly, when switch SW2 or SW3 is pushed, the retainer is positioned as shown in FIG. 24 or 25.

The control movement of the motor M is explained with reference to FIG. 26. If film 21 is intended to be used as shown in FIG. 23, from the position shown in FIG. 21 or 24, a switch SW1 is pushed. Then the motor M is rotated to the direction counter-clockwise, the projection 240' of the switch disk 240 pushes the detection switch S1 off to stop its rotation (circuit Nos. 1, 2, 10 and 14)

If film $Y_2$ is intended to be used from the position film $Y_1$ or $Y_2$ is used (FIG. 23 or 25), the switch SW2 is pushed. Consequently, the motor M rotates clockwise or counter-clockwise to detect the switch S2 to the result that the motor is stopped at the position shown in FIG. 24 (circuit Nos. 3, 4, 7, 8, 9, 11, 13, and 14,).

If film $Y_3$ is desired from the positioned shown in FIG. 23 or 24 where film $Y_1$ or $Y_2$ is used, the switch SW3 is pushed and the position shown in FIG. 25 is obtained (circuit No. 5, 6, 6, 12, and 14).

Figure 26:
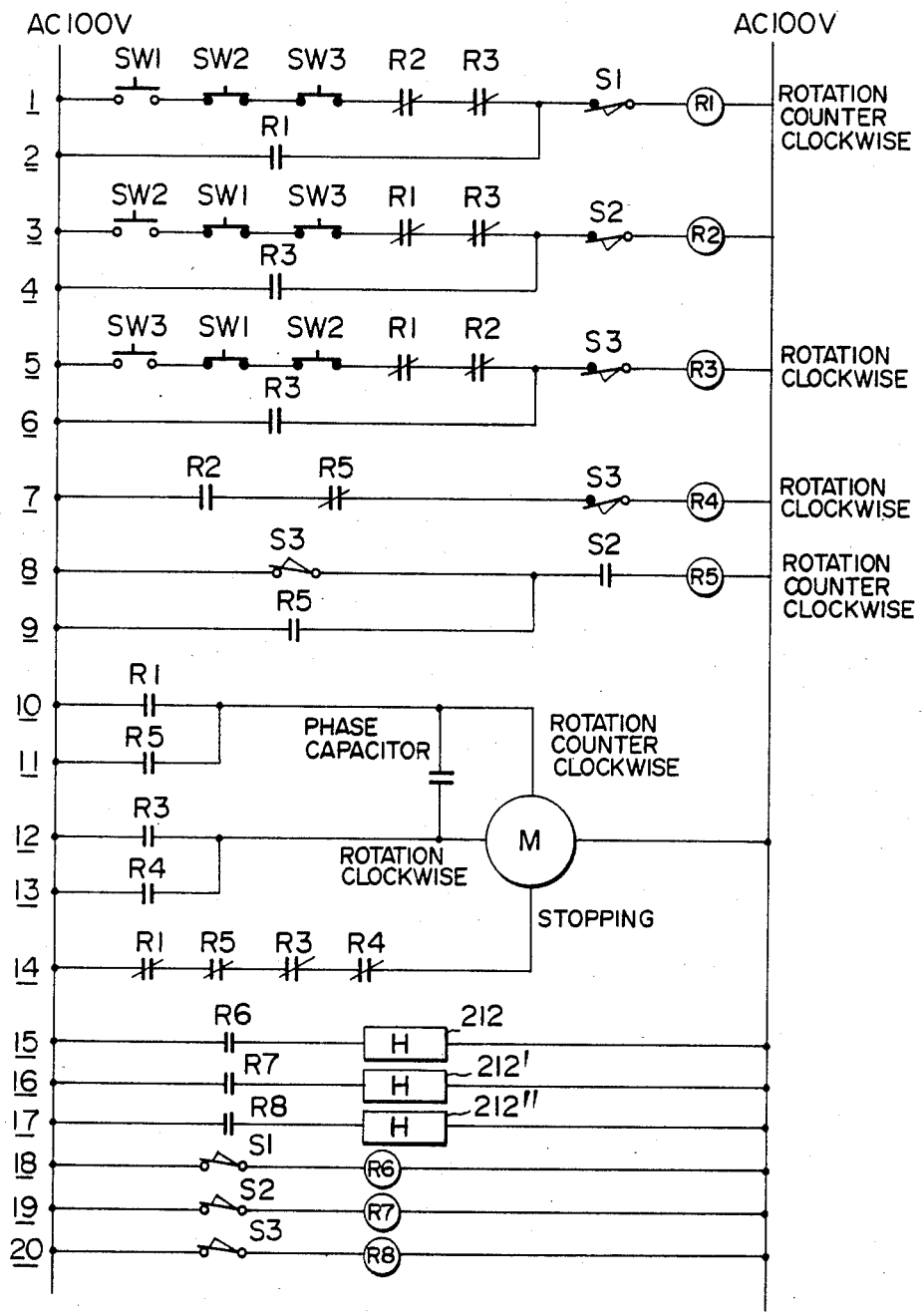
FIG. 26 is a circuit diagram for controlling an electric motor.

In FIG. 26, the circuits Nos. 15 through 20 represent the control of the film cutters 212, 212' and 212" in which the change switch SW1, SW2 or SW3 is pushed on so that any one of the cutters is activated while the other two cutters is not activated.

It is naturally possible to form such a circuit in which the temperature adjustment of the heating plate 213 is automatically carried out by the changing operation of the change switch SW1, SW2, or SW3. Although relay switches R1 through R8 are used in these control circuit, semiconductor circuits also can be employed.

It is recommended to indicate film number, size etc., on the change switch. The change switches may be provided on the console unit 218. In FIG. 20, indicator lamps 245, 246 and 247 are provided so as to display that films are finished or near to be finished. Of course other types of alarms may be used.

In FIGS. 20 through 26, a motor M and switches SW1, SW2 and SW3 are used as means for rotating the film retainer 230, a fixing plate 239 as means for positioning the retainer, and a motor control circuit including a stopper 241 and a switch disk 240 is used. Instead of the structure for automatical change of these means, a manual change structure may be used.

Figure 27:
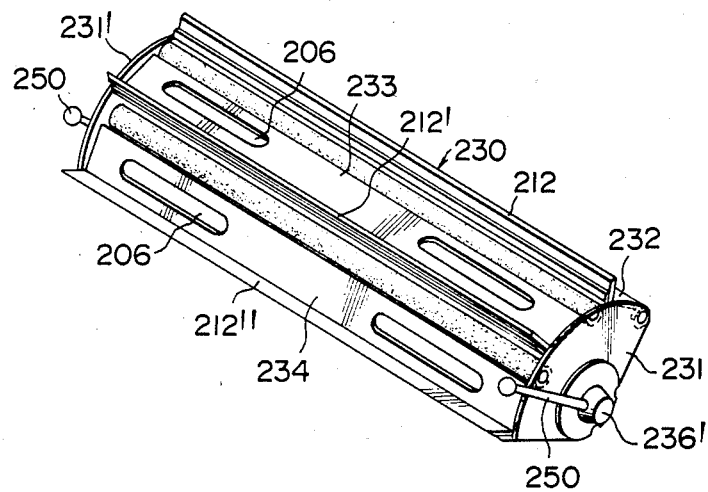
FIG. 27 is a perspective view of still further embodiment of the film retainer.

One embodiment of the manual change structure is shown in FIG. 27. In this figure, a handle 250 is projected from the shaft portion 236' of the film retainer 230. The operator can operate the handle so as to rotate the retainer 230. In this embodiment, a fixing plate 239 and a stopper 241 as well can be used as means for positioning the retainer.

According to the film feeding structure shown in FIGS. 20 through 27, the film retainer is provided at its circumference with a plurality of film receivers. The reciever, in turn, is set by a rotary means and by a fixing means. Therefore, it is not necessary to set a film roll even when a new size film is necessary and, thus, an improvement in the workability is realized.

FIGS. 28 through 32 represent further embodiments of the film feeding structure shown in FIG. 21 in which a film change is carried out by a film retainer. According to the embodiment shown in FIG. 21, the loosening of the film not used ($Y_1$ and $Y_3$ for example) is prevented by means of tensioning rollers. This system is, however, defective in that when a film change is effected so that the film $Y_1$ or $Y_2$ may be used (position shown in FIG. 23 or 25), an excessive amount of film $Y_1$ or $Y_2$ is apt to be drawn out and that, therefore, film loosening is not necessarily prevented to full extent.

The embodiments of FIGS. 28 through 32 are provided so as to prevent the loosening, adhering and contacting of the films.

Figure 28:
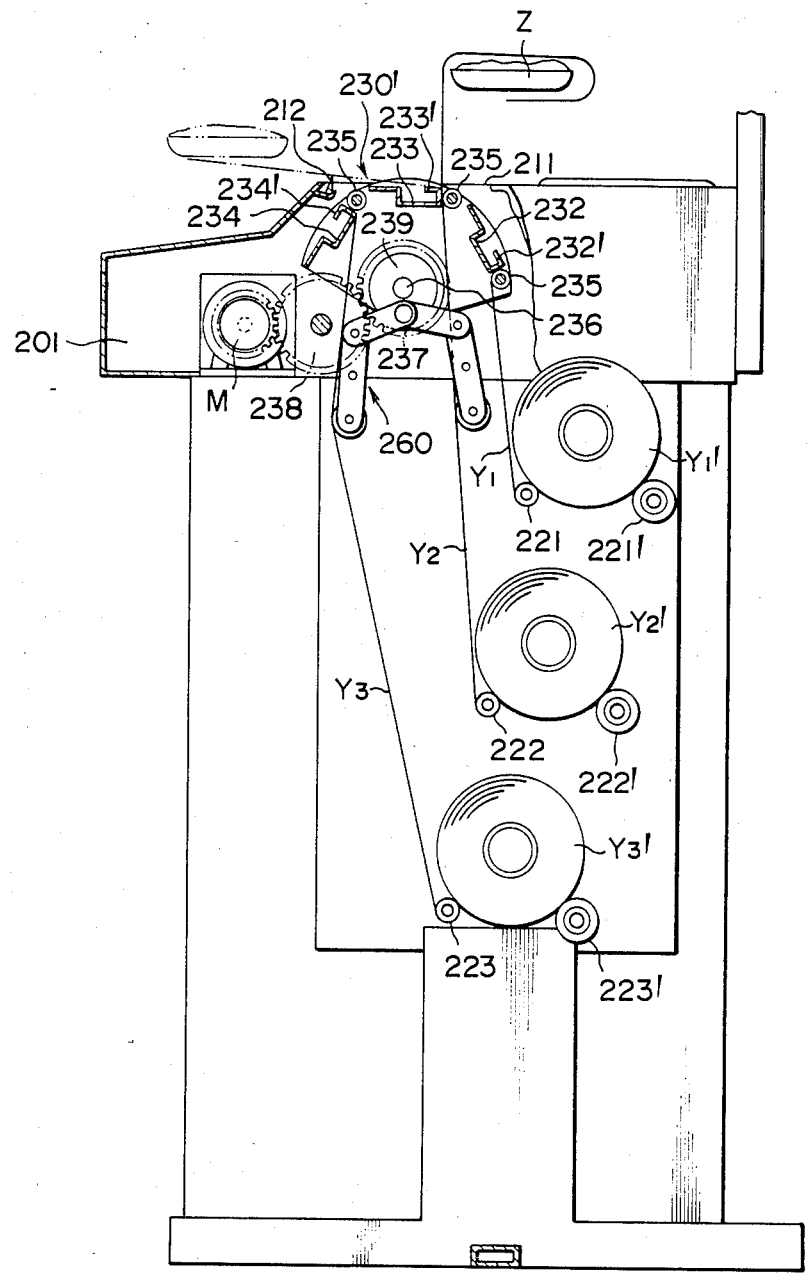
FIG. 28 is a side view, partly cut out, of the apparatus having a further embodiment of the film feeding structure.

The embodiment shown in FIG. 28 is different from that shown in FIG. 21 in the fact that a film cutter 212 is fixed to a table 201 and, thus, film receivers 232, 233, 234 of the retainer 230' lack in film cutters, and that the films are fed upward from the rollers 221, 222, 223 without the use of tension rollers.

In FIG. 28, a film distance enlarging means 260 is provided. The means is explained with reference to the film retainer 230' having a handle 250, in FIGS. 29 and 30.

Figure 29:
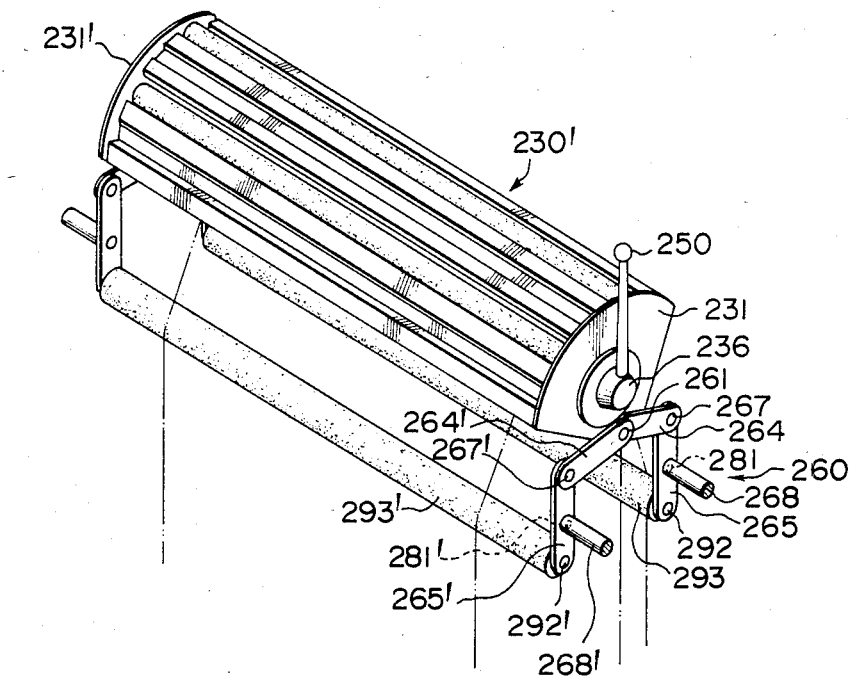
FIG. 29 is a perspective view of the important part shown in FIG. 28.

In FIG. 29 a pin 261 is provided on the supporting plate 231 or 231', and rotates together with the shaft 236 for the film retainer 230'. To this pin is rotatably mounted first arms 264, 264', of which ends are pivoted at points 281, 281' with second arms 265, 265'. The other ends of the second arms are provided with rollers 293, 293' which forcably enlarge films.

Figure 30:
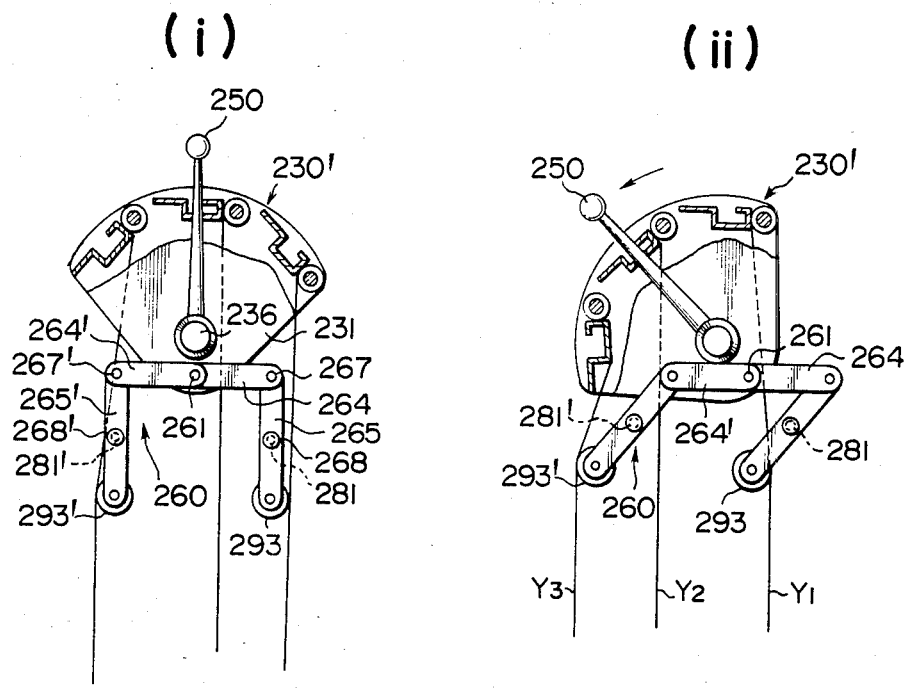
FIG. 30 is a side view showing each of filing changing positions, for explaining the important part shown in FIG. 29.
Figure 30:
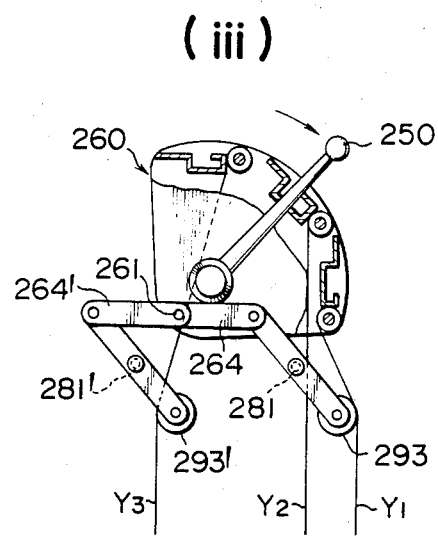

According to this structure, when a handle 250 is operated so that the supporting plate 231 is rotated, the pin 261 provided on the plate 231 is also rotated. Accordingly, the first and second arms and the rollers 293, 293' are activated to open the rollers. That is, when the handle 250 is rotated to the counter-clockwise direction as shown in FIG. 30(ii), the pin 261 is rotated to the clockwise direction. Accordingly the first arms are pulled to the right side and the points 267, 267' also move to the right side. Consequently, the second arms rotate to clockwise direction around the points 281, 281' which are fixed to the table 201. Since the roller 293' fixed to one end of the second arm 265' it moves to the left side as shown in FIG. 30(ii), and the film $Y_3$ is forced to open to the left side.

In this way, when the handle 250 is inclined to the left side, the distance between films $Y_3$ and $Y_2$ is enlarged.

FIG. 30(iii) shows a state where the film $Y_1$ is forced to open to the right side when the handle 250 is rotated clockwise.

Figure 31:
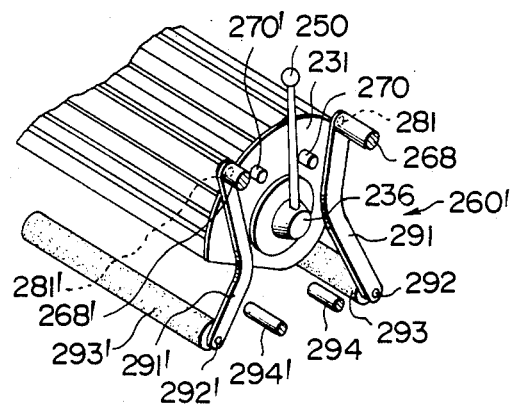
FIG. 31 is a perspective view of another embodiment of the part shown in FIG. 29.

FIG. 31 shows a variation of the film distance enlarging means in which cam pins 270, 270' are mounted to the supporting plates of the film retainer 230'. Further, supporting arms 291, 291' are provided which are pivoted to points 281, 281', of arms 268, 268' fixed to the table 201. The arm 291, 291' are moved by the rotation of the pins 270, 270' to open rollers 293, 293' fixed to the ends of the arms.

Stopping pins 294, 294' are fixed to the frame of the table and function to stop the supporting arms 291, 291', when the arms are released from the position contacting with the cam pins 270, 270'. That is, when one of the arms is opened, the other arm is stopped from rotating further by the stopping pins, so that films may be prevented from adhering and contacting with each other.

In FIG. 31, when the handle 250 is operated to counter-clockwise direction, the supporting plate 231 of the film retainer 230' is rotated to counter-clockwise direction. Consequently, the cam pins 270, 270' as well, are rotated while the supporting arm 291' are rotated to the clockwise. Accordingly, the roller 293' pivoted to the end of the arm 291' is moved to the left side and thus the film supported by the roller is moved to the left side. In this way, the distance between films can be enlarged.

Figure 32:
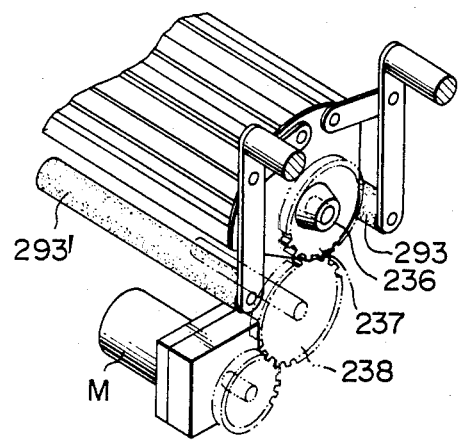
FIG. 32 is a perspective view of the part for automatic operation.
Figure 33:
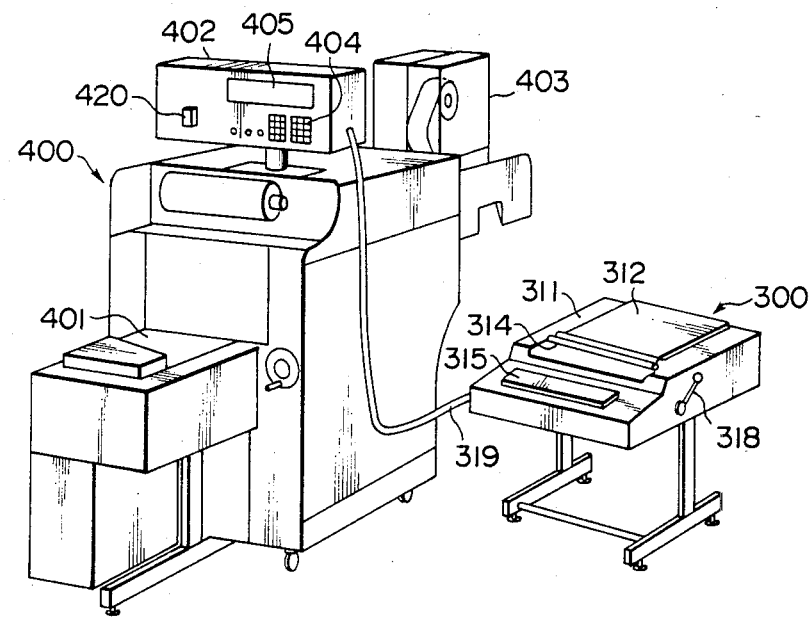
FIG. 33 is a perspective view of the apparatus illustrating its use.

FIG. 32 shows a still further variation in which a motor and a switch are used instead of the handle 250, for rotating the film retainer 230'.

FIGS. 33 through 37 show a combination of a weighing and packing apparatus (which will be referenced as weighing and packing machine 300) claimed in the appended claim 1 and a weighing and pricing machine.

The weighing and pricing machine means a weighing, pricing and automatic packing machine 400 or a weighing label-printer 500. These machines can be electrically connected to the weighing and packing machine 300.

Figure 35:
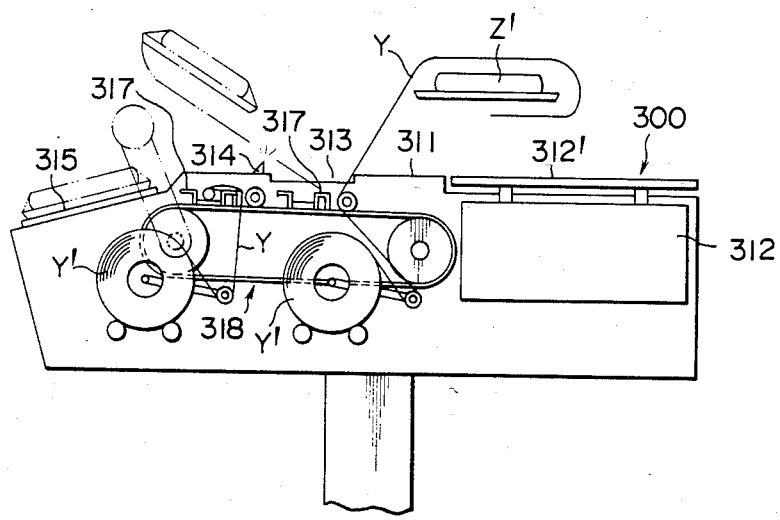
FIG. 35 is a side sectional view of the apparatus.
Figure 36:
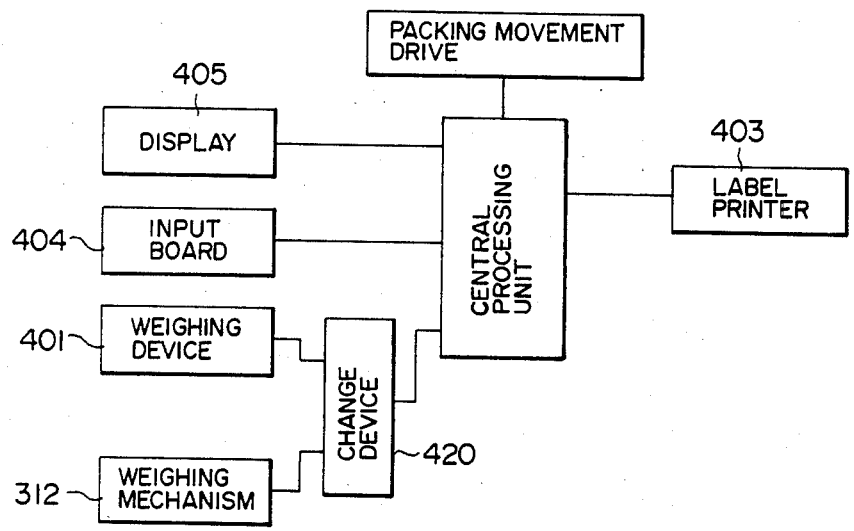
FIG. 36 is a block diagram of the use shown in FIG. 33.
Figure 37:
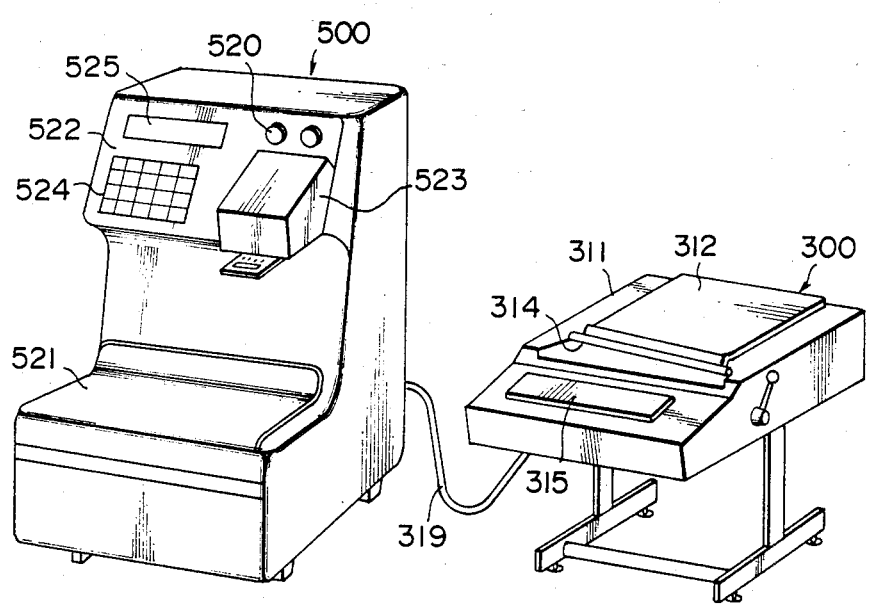
FIG. 37 is a perspective view of the apparatus illustrating further embodiment of its use.

FIGS. 33 through 36 show combinations of the machines 400 and 300, while FIG. 37 illustrates a combination of the machines 500 and 300.

Figure 34:
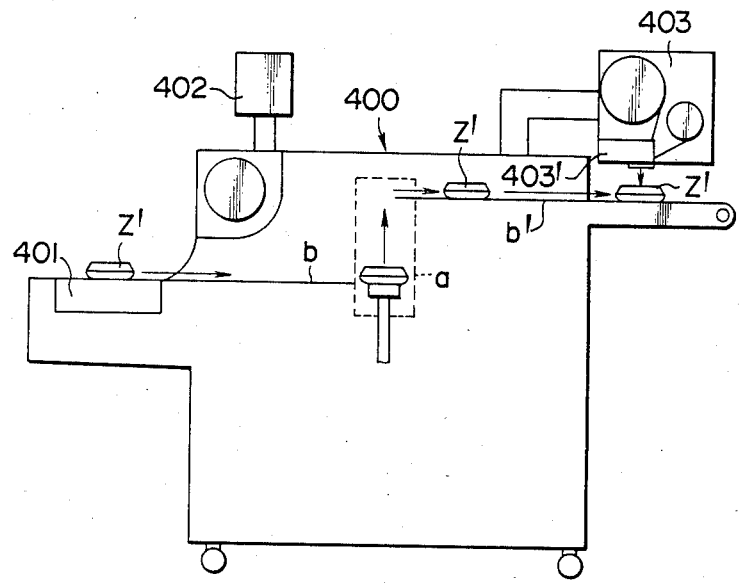
FIG. 34 is a side view of the apparatus illustrating its process of use shown in FIG. 33.

The weighing, pricing and automatic packing machine 400 consists of, as shown in FIG. 34, a packing section a, articles transporters b, b' such as belt conveyors, a weighing device 401, a control board 402 which houses a central processing unit CPU, and a label printer 403.

The control board 402 is provided with keys by the operation of which article data, such as article name, code number, unit price, produced data and bar code, can be put into CPU, and can be displayed by digital indication at the display 405.

The weighing device 401 functions to weigh the article Z' placed on it, to transmit the weight data to CPU, and to produce signal when the weight is balanced.

Article conveyor mechanism (not shown) is provided near the weighing device 401 so that the article placed on the device 401 may be automatically fed to the conveyor b. The conveyor mechanism is started when the signal is issued, while a packing section a and conveyors b, b' are moved in synchronism with the movement of the mechanism, on the basis of direction by CPU control circuit or timing mechanism.

The control processing unit CPU functions to calculate prices on the basis of weight data obtained at the weighing device and of unit price data at the input board 404, to memorize article data and price data, and to control conveyors and the label printer 403. As shown in FIG. 36, CPU controls weighing device 401, conveyors, input board 404, display 405 and label printer 403.

The label printer 403 functions to print prices and other data transmitted from CPU on labels which are stuck to packed articles Z' by a sticking device 403'.

The weighing and packing machine 300 includes, as has been explained, a weighing plate 312' of weighing mechanism 312, a film outlet 313, a film cutter 314, and a heating plate 315 on a table 311, and one or a plurality of film rolls Y' below the table 311.

In the embodiment shown in FIG. 35, two film rolls are provided. In this instance, two film retainers 317 and a film change mechanism 318 are provided below the film outlet 313, so that one film Y may be selected so as to be fed on the table 311. The film cutter 314 is formed of heated knife, and the heating plate 315 houses a heater.

When weight data of the weighed article Z' placed on the weighing plate 312' of the machine 300 is transmitted by wire 319 to CPU housed in control board 402 of the machine 400 and when the weight is balanced, a weight balance signal is issued. To this CPU are connected the weighing device 401 and the weighing mechanism 312 so as to transmit the weight data and the weight balance signal. The control board 402 may be provided with a change device 420 as shown in the block diagram of FIG. 36, to connect either of the two mechanisms 401, 312 to CPU. The device 420 may consist of push button, dial, slider or lever system device. The device 420 may be provided at the table 311 of the packing machine 300, or at the board 402 and the table 311 respectively.

Instead of wire 319 for connecting the weighing mechanism 312 of the machine 300 to CPU of the machine 400, wireless system may be used for sending weight data to CPU.

Further, instead of the switch changing system 420 as means for selecting weighing device 401 or weighing mechanism 312, electric circuit may be used which can be connected with either of the device 401 or the mechanism 312 which transmits data to CPU.

In case the article Z' is of the size which can be packed by the packing machine 400, the weighing device 401 is operated by the operation of the change device 420. When the article is placed on the plate of the device 401, weighing, packing and label issuing and labelling steps are effected automatically in a continuous manner as shown in FIG. 34.

If, however, the article can not be weighed or packed by the machine 400, the weighing mechanism 312 is operated by the operation of the change device 420.

When the article Z' is placed on the weighing plate 312', the weight data is transmitted by the mechanism 312 to CPU, and the label printer 403 issues labels which are printed with price and other data.

After film Y is drawn out from the film outlet 313 of the packing machine 300, the article on the plate 312' is wrapped by hand with the film as shown in FIG. 35. Then the film is cut by the cutter 314 and its sides are folded to the bottom so as to be welded under heat on the heating plate 315. The packed article is stuck with a label issued from the printer 313.

It is possible that the packed articles are conveyed on the conveyor b' of the machine 400 and labeled automatically by the labeler 403' of the printer 403.

FIG. 37 shows an apparatus in which the weighing and packing machine 300 mentioned above, is combined with a label printer 500. The printer 500 consists of a weighing device 521, a control board 522 which houses CPU, a label printer 523, an input board 524 provided in the control board 522, a display 525, and a change device 520. The CPU is connected by a wire 319 with the weighing mechanism 312 of the packing machine 300.

The printer 500 functions to weigh the article placed on its weighing device 521, and issues label which is printed with data on the basis of the obtained weight. In case an article is weight of which size or weight is beyond the ability of the printer 500.

In case the article need not be packed with film, it is weighed by the weighing mechanism 312, and labeled with label issued from the printer 523 without being packed.

The wire 319 of the machine 300 is preferred to be provided with a plug which is connected detachably with CPU. In this way, one packing machine 300 can be connected with an optional number of working machines. Instead of the label printers 403, 523 mentioned above, other type of printers such as a receipt printer and a calculation printer may be used.

I claim:

1. A weighing and packing apparatus comprising:
   (a) at least two rolls of film;
   (b) a table wherein said table comprises a film outlet for receiving film from one of said rolls;
   (c) a weighing mechanism comprising a weighing plate positioned in front of said film outlet in said table, said weighing mechanism being incorporated into said table;
   (d) a slack prevention means for preventing any slack in said film as said film is drawn from said roll to said film outlet;
   wherein said table further comprises side walls, film retainer comprising a plurality of film receivers for receiving adjacent films from said film rolls, a rotating means for rotating said film retainer, and a positioning means for positioning a desired film receiver to face said film outlet, wherein said film retainer is positioned between said side walls and is provided at its circumference with said plurality of film receivers to receive the end of said film from one of said rolls so that upon rotation of said retainer the distance between at least some of said adjacent films is reduced; wherein said table further comprises a means for enlarging said reduced distance between adjacent films in response to the rotation of said film retainer by said rotating means, wherein said means for enlarging the distance between adjacent films prevents said films from contacting or adhering to each other and enlarges said reduced distance between the adjacent films.

2. An apparatus defined by claim 1 wherein said apparatus further comprises a film cutter provided in parallel with said film outlet in said table and a heating plate provided to the rear of said cutter.

3. An apparatus defined by claim 1 wherein said table comprises a label printer and a central processing unit wherein said processing unit electronically connects said weighing mechanism with said label printer and wherein said processing unit comprises an input board for entering weight and price data and a display wherein said board and said display are mounted in said table and electronically connected to said processing unit.

4. An apparatus defined by claim 3 wherein said table further comprises a switch wherein said switch activates at least one of the following elements: said film cutter, said heating plate, said input board, said display, and said label printer.

5. An apparatus defined by claim 1 or 3 wherein said at least one roll of film is positioned below said film outlet.

6. An apparatus defined by claim 5 wherein said table further comprises a plurality of film roll supports wherein said film roll supports are positioned on the exterior of said film rolls.

7. An apparatus defined by claim 3 wherein said central processing unit converts weight data into price data in accordance with data entered into said input board and wherein said price data are displayed on said display and printed by said label printer.

8. An apparatus defined by claim 3 wherein said label printer is incorporated into a lateral side portion of said table and wherein said label printer comprises a label output wherein said label outlet is positioned at one side of said table.

9. An apparatus defined by claim 3 or 8 wherein said table further comprises a support wherein said support supports said input board and said display and wherein said support is positioned at the front end of said table.

10. An apparatus defined by claim 9 wherein said label printer is positioned below said heating plate and wherein said label outlet is positioned near said heating plate.

11. An apparatus defined by claim 3 or 8 wherein said input board and said display are positioned near said heating plate on said table.

12. An apparatus defined by claim 11 wherein said table further comprises an inclined surface wherein said inclined surface is positioned between said film cutter and said heating plate, wherein said input board and said display are positioned on said inclined surface.

13. An apparatus defined by claim 11 wherein said input board is positioned at the right side of said heating plate when said apparatus is viewed from the front and said display is provided at the right side of said weighing plate.

14. An apparatus defined by claim 11 wherein said table comprises a cut-out portion forming an inclined surface behind said heating plate wherein said input board and said display are positioned on said inclined surface.

15. An apparatus defined by claim 1 wherein said slack prevention means comprises an tension roller wherein said tension roller continuously places said film fed from said at least one film roll under tension so as to prevent any slack in said film as said film is drawn from said roll to said film outlet.

16. An apparatus defined by claim 15 wherein said slack prevention means further comprises a tension arm with two ends wherein one of two said ends of said tension arm is rotatably connected to said tension roller in contact with said film so as to take up any slack in said film and the other of two said ends of said tension arm is connected to said at least one film roll.

17. An apparatus defined by claim 1 further comprising at least one film roll support adapted to rotatably support said film roll on the exterior thereof, wherein said slack prevention means comprises a brake member pressed against said at least one film roll support said so as to brake at least one film roll support to brake unwinding of said film from said film roll and prevent slack in said film.

18. An apparatus defined by claim 6 wherein said table further comprises rectangular members and side walls wherein said rectangular members are provided between said side walls of said table and wherein said rectangular members rotatably support said plurality of film roll supports.

19. An apparatus defined by claim 5 wherein said table further comprises at least one film retainer corresponding to the number of said at least one film rolls wherein said at least one film retainer retains said film at said film outlet.

20. An apparatus defined by claim 19 wherein said at least one film retainer comprises one-way feeders wherein said feeders prevent said film from retracting from said at least one film retainer.

21. An apparaus defined by claim 19 wherein said at least one film retainer comprises a film receiver and a roller adapted to be positioned in open and closed positions wherein said roller in the open position is spaced from said film receiver to permit said film to move freely between said receiver and roller and wherein said roller in the closed position contacts said film receiver to hold said film between said roller and said film receiver to prevent movement thereof.

22. An apparatus defined by claim 21 wherein said at least one film retainer further comprises an inclined surface adajcent to said film receiver and a tray adjacent to said inclined surface wherein said film drawn from between said roller and said film receiver is guided by said inclined surface into said tray wherein said tray retains said film for use.

23. An apparatus defined by claim 22 wherein said film receiver comprises a vertical wall adjacent said inclined surface and said roller comprises an oblong opening therein extending upwardly at an acute angle from a vertical plane and a shaft fixed between said side walls of said table wherein said shaft has a diameter smaller than said oblong opening and engages said oblong openings, to permit movement of the roller between said open and closed positions, wherein said roller moves into said open position spaced apart from said vertical wall when said film is drawn upwardly between said roller and said vertical wall and said roller moves into said closed position when said film is drawn downwardly between said roller and said vertical wall.

24. An apparatus defined by claim 1 wherein said rotating means comprises a manually operated handle wherein said handle projects from said film retainer and is adapted to position at least one film receiver at said film outlet.

25. An apparatus defined by claim 1 wherein said rotating means is an electric motor adapted to position at least one film receiver at said film outlet.

26. An apparatus defined by claim 25 wherein said rotating means further comprises a change switch wherein said change switch is positioned on said table and controls the direction and amount of rotation of said electric motor.

27. An apparatus defined by claim 1 wherein said film retainer further comprises sector support plates wherein said plurality of film receivers are positioned between said support plates at angular intervals of 45° with respect to the centers of said sector plates.

28. An apparatus defined by claim 1 wherein said film receiver comprises a plate comprising an end bent to form a vertical wall wherein said retainer further comprises a roll adapted to contact said vertical wall of said plate.

29. An apparatus defined by claim 1 wherein said at least one film receiver is positioned parallel to said film cutter.

30. An apparatus defined by claim 29 wherein said film cutter comprises a heated knife wherein said knife is positioned at the rear end of said at least one film receiver and is adapted to sever said film.

31. An apparatus defined by claim 1 further comprising a tension roller for tensioning said film, wherein said film fed from said at least one roll of film is guided to said film receiver by said tension roller.

32. An apparatus defined by claim 1 wherein said means for enlarging the distance between adjacent films comprises a pin pivoted to said film retainer, two first arms pivoted to said pin, and two second arms with rollers pivoted to said first arms at one end wherein said second arms with rollers function to enlarge the distance between adjacent films as said film retainer rotates.

33. An apparatus defined by claim 32 further comprising a shaft attached to said table, wherein said two first arms are adapted to be displaced linearly in response to rotation of said film retainer and said two second arms with rollers pivot around said shaft in response to the linear displacement of said two first arms.

34. An apparatus defined by claim 33 wherein said two first arms and said two second arms with rollers are at right angle to each other in a rest position and are at oblique angles to each other in an active position in which said two second arms with rollers function to enlarge the distance between adjacent films.

35. An apparatus defined by claim 1 further comprising sector support plates for supporting said film receivers, wherein said means for enlarging the distance between adjacent films comprises cam pins connected to one of said sector support plates, support arms with rollers, and shafts fixed to said table wherein said support arms with rollers are pivotably attached to said shafts at one end and function to enlarge the distance between adjacent films as said cam pins contact and displace said support arms with rollers about said shafts fixed to said table as said film retainer rotates.

36. An apparatus defined by claim 35 wherein said support arms with rollers are adapted to be displaced linearly in response to rotation of said film retainer as said support arms with rollers contact said cam pins.

37. An apparatus defined by claim 1 wherein said weighing and packing apparatus further comprises a weighing and pricing machine wherein said weighing and pricing machine comprises a weighing device for weighing articles, a label printer for issuing printed labels, a central processing unit wherein said processing unit electronically connects said weighing device with said label printer and said weighing mechanism of said weighing and packing apparatus, and a means to activate either said weighing device or said weighing mechanism.

38. An apparatus defined by claim 37 wherein said weighing and pricing apparatus further comprises a weighing, pricing, and automatic packing machine.

39. An apparatus defined by claim 37 wherein said weighing and packing apparatus further comprised a weighing-label printer machine.

40. A weighing and packing apparatus comprising:
(a) at least two adjacent rolls of film;
(b) a table wherein said table comprises a film outlet for receiving film from one of said rolls;
(c) a weighing mechanism comprising a weighing plate positioned in front of said film outlet in said table, said weighing mechanism being incorporated into said table;
(d) wherein said table further comprises side walls, film retainer comprising a plurality of film receivers for receiving adjacent films from said film rolls, a rotating means for rotating said film retainer, and a positioning mean for positioning a desired film receiver to face said film outlet, wherein said film retainer is positioned between said side walls and is provided at its circumference with said plurality of film receivers to receive the end of said film from one of said rolls so that upon rotation of said retainer the distance between at least some of said adjacent films is reduced; wherein said table further comprises a means for enlarging said reduced distance between adjacent films in response to the rotation of said film retainer by said rotating means, wherein said means for enlarging the distance between adjacent films prevents said films from contacting or adhering to each other and enlarges said reduced distance between the adjacent films.

41. An apparatus defined by claim 40 wherein said apparatus further comprises a film cutter provided in parallel with said film outlet in said table and a heating plate provided to the rear of said cutter.

42. An apparatus defined by claim 40 wherein said film retainer comprises sector support plates and said film receivers adapted to receive an end of said film wherein said plurality of film receivers is positioned between said support plates.

43. An apparatus defined by claim 40 wherein said means for enlarging the distance between adjacent films comprises a pin pivoted to said film retainer, two first arms pivoted to said pin, and two second arms with rollers pivoted to said first arms at one end wherein said second arms with rollers function to enlarge the distance between adjacent films as said film retainer rotates.

44. An apparatus defined by claim 43 wherein said two first arms are adapted to be displaced linearly in response to rotation of said film retainer and said two second arms with rollers pivot around said shafts fixed to said table in response to the linear displacement of said first two arms.

45. An apparatus defined by claim 44 wherein said two first arms and said two second arms with rollers are at right angles to each other in a rest position and are at oblique angles to each other in an active position in which said two second arms with rollers function to enlarge the distance between adjacent films.

46. An apparatus defined by claim 40 wherein said means for enlarging the distance between adjacent films comprises cam pins connected to one of said sector support plates of said film retainer, support arms with rollers, and shafts fixed to said table wherein said support arms with rollers are pivotably attached to said shafts at one end and function to enlarge the distance between adjacent films as said cam pins contact and displace said support arms with rollers about said shafts fixed to said table as said film retainer rotates.

47. An apparatus defined by claim 46 wherein said support arms with rollers are adapted to be displaced linearly in response to rotation of said film retainer as said support arms with rollers contact said cam pins.

* * * * *